(12) United States Patent
Urakami et al.

(10) Patent No.: US 8,513,341 B2
(45) Date of Patent: Aug. 20, 2013

(54) POLYLACTIC ACID RESIN COMPOSITION AND MOLDED ARTICLE THEREOF

(75) Inventors: Tatsuhiro Urakami, Ichihara (JP); Choujirou Higuchi, Chigasaki (JP)

(73) Assignee: Mitsui Chemicals, Inc., Minato-Ku, Tokyo (JP)

(*) Notice: Subject to any disclaimer, the term of this patent is extended or adjusted under 35 U.S.C. 154(b) by 0 days.

(21) Appl. No.: 12/375,000

(22) PCT Filed: Jul. 11, 2007

(86) PCT No.: PCT/JP2007/063841
§ 371 (c)(1), (2), (4) Date: Jan. 23, 2009

(87) PCT Pub. No.: WO2008/013058
PCT Pub. Date: Jan. 31, 2008

(65) Prior Publication Data
US 2009/0203852 A1 Aug. 13, 2009

(30) Foreign Application Priority Data
Jul. 26, 2006 (JP) .................................. 2006-203878

(51) Int. Cl.
*C08K 5/20* (2006.01)
*C08K 5/101* (2006.01)

(52) U.S. Cl.
USPC ............ 524/223; 524/210; 524/227; 524/318

(58) Field of Classification Search
USPC .................................. 524/227, 210, 223, 318
See application file for complete search history.

(56) References Cited

U.S. PATENT DOCUMENTS

| | | | |
|---|---|---|---|
| 7,632,897 B2 | 12/2009 | Matsumoto et al. | |
| 7,652,085 B2 | 1/2010 | Takenaka et al. | |
| 2002/0002252 A1 * | 1/2002 | Obuchi et al. | 525/450 |
| 2005/0001349 A1 | 1/2005 | Yosimura et al. | |
| 2008/0097008 A2 * | 4/2008 | Yamada et al. | 523/212 |

FOREIGN PATENT DOCUMENTS

| | | |
|---|---|---|
| CN | 1585802 A | 2/2005 |
| JP | 09-278991 A | 10/1997 |
| JP | 11-124495 A | 5/1999 |
| JP | 2002-167497 A | 6/2002 |
| JP | 2002-292665 A | 10/2002 |
| JP | 2003-192884 A | 7/2003 |
| JP | 2004-149692 A | 5/2004 |
| JP | 2004-285121 A | 10/2004 |
| JP | 2004-359828 A | 12/2004 |
| JP | 2006-16605 A | 1/2006 |
| JP | 2006-45300 A | 2/2006 |
| JP | 2006-176747 A | 7/2006 |
| JP | 2006-335904 A | 12/2006 |
| JP | 2007-016091 A | 1/2007 |
| JP | 2007-046050 A | 2/2007 |
| WO | WO 2004/000939 | 12/2003 |

OTHER PUBLICATIONS

Machine translation of JP 2004-359828. Dec. 2004.*
International Search Report for PCT/JP2007/063841, completed Sep. 12, 2007.
Office Action issued in corresponding Japanese Patent Application No. 2008-526724 dated Dec. 11, 2012.

* cited by examiner

*Primary Examiner* — John Uselding
(74) *Attorney, Agent, or Firm* — Buchanan Ingersoll & Rooney PC

(57) ABSTRACT

A polylactic acid resin composition containing 100 parts by weight of a polylactic acid compound (A) having a specific moiety represented by the formula (1): —$X^1$—$R^1$—$X^2$— and having a weight average molecular weight (Mw) of 5,000 to 500,000, 5 to 2,000 parts by weight of a lactic acid resin (B) and 0.1 to 10 parts by weight of at least one kind of a transparent nucleating agent (C) selected from carboxylic acid amides, aliphatic alcohols and aliphatic carboxylic acid esters. In the formula (1), $X^1$, $X^2$ and $R^1$ are defined. The resin composition can exhibit improved heat resistance (high crystallinity) and transparency without impairing the rigidity of the polylactic acid resin. A molded article composed of the resin composition is also provided.

8 Claims, No Drawings

POLYLACTIC ACID RESIN COMPOSITION AND MOLDED ARTICLE THEREOF

TECHNICAL FIELD

The present invention relates to a polylactic acid resin composition which is increased in transparency, rate of crystallization and heat resistance and a molded article comprising the composition.

BACKGROUND ART

With increasing awareness of global environment issues, the depletion of fossil materials and oil resources and the increase in carbon dioxide have posed a problem. For this reason, the research and development of a biodegradable resin such as an aliphatic polyester and the like and a resin synthesized by using plants as raw materials have been actively conducted. Among aliphatic polyesters, a polylactic acid having excellent moldability has especially attracted attention as a resin of plant origin which is produced from lactic acid obtained by fermentation of grain resources such as corn and the like.

However, since polylactic acid has a drawback of being rigid and brittle as well as has a slow rate of crystallization and low heat resistance, the use expansion is limited. Particularly, in the case of a polylactic acid amorphous molding article, because it has a softening point of less than 60° C., a problem easily causing whitening, deformation and the like in daily use environments was pointed out.

In addition, if attempts are made to improve the heat resistance of polylactic acid by increasing the crystallinity by heat-treating (annealing), crystals (for example, spherocrystals) having sizes almost equal to or larger than the wavelength of light, which cause scattering of light, generally grow rapidly, and the molded article becomes opaque.

In order to solve these problems, a lot of attempts have been made to improve heat resistance and transparency by adding various additives to polylactic acid.

In patent document 1, it is described that the addition of a phosphate ester metal salt, hydrous magnesium silicate and the like as a nucleating agent is effective. However, when such a nucleating agent is used, polylactic acid has a drawback in that the transparency is impaired. In addition, talc commonly used is practically usable only from the viewpoint of the rate of crystallization. However, to achieve this, the addition amount of talc is often required to be 1% or more, and talc has a drawback of impairing transparency which is an inherent characteristic of polylactic acid.

In patent document 2, there is described a process of adding as a nucleating agent at least one kind of transparent nucleating agent selected from an aliphatic carboxylic acid amide, an aliphatic carboxylic acid salt, an aliphatic alcohol and an aliphatic carboxylic acid ester. However, in this case, the molded article had a crystallinity of 33% and a haze of 6.5%, and the result having both sufficient crystallinity and transparency was not obtained.

In patent document 3, there is described a process of using polylactic acid and an inorganic filler in which a compound having a specific functional group is used as an initiator. However, although the slip properties were improved by this process, the transparency was not maintained because an inorganic filler was added.

Patent document 1: Japanese Patent Laid-Open Publication No. 192884/2003
Patent document 2: Japanese Patent Laid-Open Publication No. 278991/1997
Patent document 3: Japanese Patent Laid-Open Publication No. 285121/2004

DISCLOSURE OF THE INVENTION

Problem to be Solved by the Invention

An object of the present invention is to provide a resin composition having increased heat resistance (high crystallinity) and transparency without impairing rigidity which a polylactic acid resin inherently has, and a molded article composed of the resin composition.

Means for Solving the Problems

The present inventors have conducted earnest studies to solve the problems and as a result, have found that the problems may be solved by using a polylactic acid compound having a specific moiety.

That is, the polylactic acid resin composition of the present invention contains 100 parts by weight of a polylactic acid compound (A) having a specific moiety represented by the following formula (I) and having a weight average molecular weight (Mw) of 5,000 to 500,000, 5 to 2,000 parts by weight of a lactic acid resin (B) and 0.1 to 10 parts by weight of at least one kind of a transparent nucleating agent (C) selected from carboxylic acid amides, aliphatic alcohols and aliphatic carboxylic acid esters.

$$-X^1-R^1-X^2- \qquad (1)$$

In the formula (I), $X^1$ and $X^2$ each independently represent an oxygen atom, a sulfur atom or an NH group, $R^1$ represents an aliphatic hydrocarbon group having a weight average molecular weight of 25 to 50,000 without containing a ring structure, and the hydrocarbon group may contain an oxygen atom, a nitrogen atom or a sulfur atom.

In the polylactic acid resin composition of the present invention, when the composition is melted at 220° C. for 3 minutes and then cooled to 100° C. at a cooling rate of 99° C./min and maintained at 100° C., the isothermal crystallization time is preferably 5 minutes or less.

The moiety represented by the formula (1) is preferably a segment derived from at least one kind selected from diols, polyesters having hydroxyl groups at both terminals and polycarbonates having hydroxyl groups at both terminals. In addition, the diols are preferably at least one kind selected from alkylene glycols, polymethylene glycols and polyalkylene glycols.

The lactic acid resin (B) is preferably a polylactic acid.

The transparent nucleating agent (C) preferably is a carboxylic acid amide, and the carboxylic acid amide is further preferably at least one kind selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylene biscapric acid amide, ethylene bislauric acid amide, ethylene bisstearic acid amide, ethylene bisoleic acid amide, ethylene-bis-12-hydroxystearic acid amide, hexamethylenebiscapric acid amide, hexamethylenebislauric acid amide, hexamethylenebisstearic acid amide, hexamethylenebisoleic acid amide, hexamethylene-bis-12-hydroxystearic acid amide, m-xylylene-bis-capric acid amide, m-xylylene-bis-lauric acid amide, m-xylylene-bis-stearic acid amide, m-xylylene-bis-oleic acid amide and m-xylylene-bis-12-hydroxystearic acid amide.

A molded article of the present invention is composed of the polylactic acid resin composition of the present invention, has a haze of 0.1 to 15% as measured at a thickness of 100 μm and has a crystallinity of 35% or more.

Effect of the Invention

Since the rate of crystallization and transparency are increased according to the present invention, the present invention may be applied to a product which requires the molding cycle shortening, heat resistance and transparency which are conventionally difficult to be obtained and may give a contribution to the use expansion of green plastics represented by a polylactic acid resin.

BEST MODE FOR CARRYING OUT THE INVENTION

Hereinafter, there will be explained in detail a polylactic acid resin composition of the present invention and a molded article thereof. First, there will be explained each component which may be used in the polylactic acid resin composition of the present invention.

<Polylactic Acid Compound (A)>

The polylactic acid compound (A), which is used in the polylactic acid resin composition of the present invention, is a polymer which has a specific moiety (hereinafter also referred to as a "soft segment") represented by the following formula (I) in a polymer chain of a lactic acid resin (B) described later and has a weight average molecular weight (Mw) of 5,000 to 500,000.

$$-X^1-R^1-X^2-  \qquad (1)$$

In the formula (1), $X^1$ and $X^2$ each independently represent an oxygen atom, a sulfur atom or an NH group, $R_1$ represents an aliphatic hydrocarbon group having a weight average molecular weight of 25 to 50,000 and containing no ring structure, and the aliphatic hydrocarbon group may contain an oxygen atom, a nitrogen atom or a sulfur atom.

As described above, the "soft segment" in the present invention is an aliphatic hydrocarbon group containing no ring structure such as an aliphatic ring, an aromatic ring and the like (provided that it may contain an atom such as O, N, S and the like) and is a segment derived from a compound containing two or more functional groups derived from a hydroxyl group, a thiol group or an amino group.

The content of the soft segment in the polylactic acid compound (A) is not particularly limited, but preferably 0.01 to 5% by mole and more preferably 0.03 to 3% by mole. Additionally, in reality, it is desired that the content of the soft segment is calculated from a weight average molecular weight of the compound (A) to be obtained in producing the polylactic acid compound (A) and a weight average molecular weight of the soft segment part, and the amount for obtaining the targeted weight average molecular weight is determined by actually performing the reaction.

The polylactic acid compound (A) may be obtained by a well-known and generally used method, and, for example, may be obtained by copolymerizing a compound having the soft segment with a monomer containing lactide or lactic acid as a main component. As another monomer other than lactide and lactic acid, there may be used cyclic esters (lactones) such as caprolactone, propiolactone, butyrolactone and the like, and hydroxyalkanoic acids such as hydroxybutanoic acid, hydroxypropanoic acid and the like.

A compound having the soft segment preferably includes diols such as alkylene glycols, polymethylene glycols, polyalkylene glycols and the like; polyesters having two or more hydroxyl groups; polycarbonates having two or more hydroxyl groups; and others, and more preferably includes polyalkylene glycols, polyesters in which both terminal are hydroxyl groups, polycarbonates in which both terminal are hydroxyl groups, and the like.

As diols such as the alkylene glycols, polymethylene glycols and polyalkylene glycols and the like, there may be mentioned ethylene glycol, propylene glycol, 1,3-propanediol, 1,4-butanediol, 1,8-octanediol, diethylene glycol, tetraethylene glycol, polyethylene glycol (PEG), polypropylene glycol (PPG) and the like. Among these, polyethylene glycol (PEG) and polypropylene glycol (PPG) are more preferred.

As the polyesters having two or more hydroxyl groups, for example, there may be mentioned polyesters in which a diol component is excessively reacted with dicarboxylic acid in polyesters produced from dicarboxylic acids and diols, or polyesters in which cyclic esters such as caprolactone and the like are ring-opening polymerized with water or diols, or the like.

As the dicarboxylic acid used in the production of the polyesters, there may mentioned, for example, an aliphatic or aromatic dicarboxylic acid having 4 to 20 carbon atoms such as maleic acid, fumaric acid, succinic acid, adipic acid and the like.

As the diols used in the production of the polyesters, there may mentioned, for example, a linear or branched aliphatic diol having 2 to 20 carbon atoms such as ethylene glycol, 1,3-propanediol, propylene glycol, 1,4-butanediol, neopentyl glycol and the like.

As more desirable examples of the polyesters having two or more hydroxyl groups, there may be mentioned a polycaprolactone having hydroxyl groups at both terminals, polyesters having hydroxyl groups at both terminals and using succinic acid or adipic acid as a carboxylic acid component and polyesters having hydroxyl groups at both terminals and using ethylene glycol, 1,3-propanediol or 1,4-butanediol as a diol component.

As the polycarbonates having two or more hydroxyl groups, there may be mentioned aliphatic polycarbonates obtained by reacting diols with phosgene or the derivative thereof or carbonic esters.

As the diols used in the production of the aliphatic polycarbonates, there may be mentioned, for example, ethylene glycol, 1,3-propanediol, 1,4-butanediol, 1,5-pentanediol, 1,6-hexanediol, 2,8-octanediol and the like.

As more desirable examples of the polycarbonates having two or more hydroxyl groups, there may be mentioned polycarbonates having hydroxyl groups at both terminals and using 1,3-propanediol, polycarbonates having hydroxyl groups at both terminals and using 1,4-butanediol and polycarbonates having hydroxyl groups at both terminals and using 1,6-hexanediol.

The weight average molecular weight of the soft segment may be calculated from a weight average molecular weight of a compound having the soft segment, and is in the range from 25 to 50,000, preferably from 50 to 10,000 and more preferably from 100 to 5,000.

Although there may be no compatibility between diols such as alkylene glycols, polymethylene glycols, polyalkylene glycols and the like, polyesters or polycarbonates or others and lactic acid or lactide, after completion of the reaction, the polylactic acid compound (A) used in the present invention have to be homogeneous and exhibit transparency.

In carrying out polymerization to obtain the polylactic acid compound (A), a solvent may be used. The solvent includes, for example, an aliphatic hydrocarbon such as hexane, heptane, decane and the like; an aromatic halogenated hydrocarbon such as chlorobenzene, o-dichlorobenzene and the like; an alicyclic hydrocarbon such as cyclopentane, cyclohexane and the like; an aromatic hydrocarbon such as benzene, toluene, xylene, mesitylene, ethylbenzene, diethylbenzene and the like; an ether solvent such as diethyl ether, dioxane, tetrahydrofuran (THF), diglyme and the like; and others. However, all solvents which are substantially inert to the reaction may be used.

These solvents may be used alone or in combination with two or more kinds. From the viewpoints of the solubility of lactide or lactic acid, reaction temperature, reaction rate, easiness of solvent removal after the completion of reaction, and the like, an aromatic hydrocarbon, an aromatic halogenated hydrocarbon and an ether solvent are preferred, and especially xylene, toluene, chlorobenzene, o-dichlorobenzene and diglyme are preferred. The amount used of the solvent is selected in a range from 0.1 to 20 times, preferably from 0.5 to 10 times and more preferably 1.0 to 5 times based on the total weight of lactide or lactic acid.

In addition, as a catalyst used in the polymerization, a well-known catalyst may be used. For example, there may be mentioned a tin catalyst such as tin octanoate (tin 2-ethylhexanoate), tin dibutyl dilaurate, tin chloride and the like; a titanium catalyst such as titanium chloride, titanium tetraisopropoxide and the like; and a zinc catalyst such as zinc chloride, zinc acetate and the like. Among these, a tin catalyst is preferred and tin octanoate is more preferred. The used amount of the catalyst is 0.001 to 5 parts by weight, preferably 0.003 to 1 part by weight and more preferably 0.005 to 0.1 part by weight, based on 100 parts by weight of lactide or a lactic acid.

The polymerization temperature is 60 to 250° C. and preferably 100 to 230° C. For example, when a solvent is not used, the reaction temperature is preferably approximately 150 to 200° C. In addition, when lactide is reacted with a polymerization initiator using xylene as a solvent and tin octanoate as a catalyst, the reaction temperature is preferably approximately 110 to 150° C.

The polymerization time varies depending on the type of a monomer used, polymerization temperature, the amount of the catalyst and the like, and is 0.1 to 24 hours, preferably 0.5 to 12 hours and more preferably 1 to 6 hours. In reality, in performing the reaction, the weight average molecular weight is measured by gel permeation chromatography (GPC) and the like to determine the point at which a desired weight average molecular weight is achieved as the reaction end point.

The polylactic acid compound (A) obtained in the manner described above has a weight average molecular weight from 5,000 to 500,000, preferably from 10,000 to 400,000 and more preferably from 50,000 to 300,000.

The weight average molecular weight (Mw) shown in the present invention is a value measured by gel permeation chromatography (GPC) (column temperature: 40° C., solvent: chloroform) through comparison with a polystyrene standard sample.

<Lacetic Acid Resin (B)>

The polylactic acid resin composition of the present invention contains a lactic acid resin (B) other than the polylactic acid compound (A). The "a lactic acid resin" here means a polymer composition containing 50% by mole or more, preferably 75% by mole or more of L-lactic acid units and/or D-lactic acid units as the main component, and it is synthesized by the polycondensation of lactic acid or by the ring-opening polymerization of lactide which is a cyclic dimer of lactic acid.

The lactic acid resin (B) may be a copolymer of lactic acid and a copolymerizable other monomer. Preferred is a polylactic acid having 100% by mole of lactic units, and more preferred is a polylactic acid having 95% by mole or more, more preferably 97% by mole or more of constitutional units derived from L-lactic acid.

In the case of producing the polylactic acid resin composition of the present invention, there may be used a composition containing the lactic acid resin (B) in which other resins, additives and the like are mixed so long as the properties of the lactic acid resin (B) are not significantly impaired.

The lactic acid resin (B) has a weight average molecular weight (Mw) from 5,000 to 500,000, preferably from 10,000 to 400,000 and more preferably 50,000 to 300,000.

The monomer copolymerizable with lactic acid includes hydroxycarboxylic acid (for example, glycolic acid, caproic acid and the like), aliphatic polyhydric alcohol (for example, butanediol, ethylene glycol and the like), aliphatic polyhydric carboxylic acid (for example, succinic acid, adipic acid and the like), and others.

When the lactic acid resin (B) is a copolymer, the form of arrangement of the copolymer may be any form of a random copolymer, an alternating copolymer, a block copolymer, a graft copolymer and the like. These may be a copolymer in which at least part thereof is copolymerized with a polyhydric alcohol of bifunctional or more such as ethylene glycol, diethylene glycol, triethylene glycol, polyethylene glycol, propylene glycol, dipropylene glycol, ethylene glycol-propylene glycol copolymer, 1,3-butanediol, 1,4-butanediol, 3-methyl-1,5-pentanediol, 1,6-hexanediol, 1,9-nonanediol, neopentyl glycol, polytetramethylene glycol, glycerin, trimethylol propane and the like; a polyvalent isocyanate such as xylylene diisocyanate, 2,4-tolylene diisocyanate and the like; polysaccharides such as cellulose, acetyl cellulose, ethyl cellulose and the like; and others. In addition, at least a part thereof may have any structure of a linear, cyclic, branched, star, three-dimensional net structure or the like.

The lactic acid resin (B) may be used in an amount from 5 to 2,000 parts by weight, preferably 15 to 1,500 parts by weight and more preferably 30 to 1,000 parts by weight, based on 100 parts by weight of the polylactic acid compound (A). If the content of the lactic acid resin (B) is within the range, there may be obtained a composition having an excellent rate of crystallization and an excellent transparency.

<Transparent Nucleating Agent (C)>

The polylactic acid resin composition of the present invention contains a transparent nucleating agent (C). Here, "a transparent nucleating agent" becomes a nucleating agent at the time of crystallization and imparts transparency when added to the polylactic acid compound (A) having a specific structure. Specifically, there may be mentioned a carboxylic acid amide, an aliphatic alcohol and an aliphatic carboxylic acid ester. These may be used alone or in combination with two or more kinds.

The specific examples of the carboxylic acid amide include aliphatic monocarboxylic acid amides such as lauric acid amide, palmitic acid amide, oleic acid amide, stearic acid amide, erucic acid amide, behenic acid amide, ricinoleic acid amide and hydroxystearic acid amide; N-substituted aliphatic monocarboxylic acid amides such as N-oleyl palmitic acid amide, N-oleyl oleic acid amide, N-oleyl stearic acid amide, N-stearyl oleic acid amide, N-stearyl stearic acid amide, N-stearyl erucic acid amide, methylol stearic acid amide and methylol behenic acid amide; aliphatic biscarboxylic acid amides such as methylene bisstearic acid amide, ethylene bisstearic acid amide, ethylene bislauric acid amide, ethylene biscapric acid amide, ethylene bisstearic acid amide, ethylene bisoleic acid amide, ethylene biserucic acid amide, ethylene bisbehenic acid amide, ethylene bisisostearic acid amide, ethylene bishydroxystearic acid amide, butylene bisstearic acid amide, hexamethylene bisoleic acid amide, hexamethylene bisstearic acid amide, hexamethylene bisbehenic acid amide, hexamethylene bishydroxystearic acid amide, m-xylylene bisoleic acid amide, m-xylylene bisstearic acid amide, m-xylylene bisbehenic acid amide and m-xylylene bishydroxystearic acid amide; N-substituted aliphatic carboxylic acid bisamides such as N,N'-dioleyl sebacic acid amide, N,N'-dioleyl adipic acid amide, N,N'-distearyl adipic acid amide, N,N'-distearyl sebacic acid amide, N,N'-distearyl isophthalic acid amide and N,N'-distearyl terephthalic acid amide; and N-substituted ureas such as N-butyl-N'-stearyl urea, N-propyl-N'-stearyl urea, N-stearyl-N'-stearyl urea, N-phenyl-N'-stearyl urea, xylylene bisstearyl urea, xylylene bisstearyl urea, toluoylene bisstearyl urea, hexamethylene bisstearyl urea, diphenylmethane bisstearyl urea and diphenylmethane bislauryl urea.

Among these, biscarboxylic acid amide is preferably used, and especially ethylene bislauric acid amide, ethylene bisoleic acid amide, ethylene bisstearic acid amide, ethylene bis-12-hydroxystearic acid amide, hexamethylene bislauric acid amide, hexamethylene bisoleic acid amide, hexamethylene bis-12-hydroxystearic acid amide, m-xylylene bislauric acid amide, m-xylylene bisoleic acid amide and m-xylylene bis-12-hydroxystearic acid amide are preferred. Further, from the viewpoint of having an excellent rate of crystallization, ethylene bislauric acid amide, ethylene bisoleic acid amide, ethylene bisstearic acid amide, ethylene bis-12-hydroxystearic acid amide, hexamethylene bislauric acid amide, hexamethylene bisoleic acid amide and hexamethylene bis-12-hydroxystearic acid amide, which have no aromatic ring in the molecule, are preferred.

The specific examples of the aliphatic alcohol include pentadecyl alcohol, cetyl alcohol, heptadecyl alcohol, 1,6-hexanediol, 1,8-octanediol, cyclohexane-1,2-diol, cyclohexane-1,4-diol and the like.

The specific examples of the aliphatic carboxylic acid ester include lauric acid cetyl ester, palmitic acid cetyl ester, stearic acid cetyl ester, dilauric acid glycol, dipalmitic acid glycol, monolauric acid glycerin ester, monostearic acid glycerin ester and the like.

The transparent nucleating agent (C) may be used in the range from 0.1 to 10 parts by weight, preferably from 0.2 to 5 parts by weight and more preferably from 0.3 to 3 parts by weight, based on 100 parts by weight of the polylactic acid compound (A). If the content of the transparent nucleating agent (C) is within the range, the effect as a nucleating agent is significantly exhibited, and a resin composition having both a high rate of crystallization and a high transparency is obtained.

<Various Additives and the Like>

To the polylactic acid resin composition of the present invention, other resins or polymers other than the components (A) to (C) and various additives may be added, according to the objective (for example, improvement of moldability, secondary processability, degradation property, tensile strength, heat resistance, storage stability, weather resistance, flame retardancy and the like).

The other resins or polymers include polycarbonate resin, unmodified polyolefin, vinyl resin, polystyrene, polyamide, acrylic resin, polyphenylene sulfide resin, polyether ether ketone resin, polyester, polysulfone, polyphenylene oxide, polyimide, polyether imide, acrylonitrile-butadiene-styrene copolymer (ABS), ethylene-α-olefin copolymer rubber, conjugated diene rubber, styrene rubber, phenolic resin, melamine resin, polyester resin, silicone resin, epoxy resin and the like. These may be used alone or in combination with two or more kinds.

The various additives include, for example, a plasticizer, an antioxidant, an ultraviolet absorber, a heat stabilizer, a flame retardant, an internal release agent, an inorganic additive, an organic additive, an antistatic agent, a surface wetting improver, an incineration auxiliary, a pigment, a dye, a nucleating agent, a lubricant, a natural substance, and the like, and preferably include a plasticizer.

The plasticizer includes, for example, triacetin, triethylene glycol diacetate, triethyl acetyl citrate, tributyl acetyl citrate, dibutyl sebacate, silicone oil and the like.

The inorganic additive and lubricant may be used to improve blocking prevention or slipping properties of a film or a sheet. Such an inorganic additive includes silica, mica, talc, glass fiber, glass bead, kaolin, kaolinite, barium sulfate, calcium sulfate, magnesium hydroxide, wollastonite, carbon fiber, calcium silicate fiber, magnesium oxysulfate fiber, potassium titanate fiber, calcium sulfite, white carbon, clay, montmorillonite, titaniumoxide, zincoxideandthe like. These may be used alone or in combination with two or more kinds. Especially when a glass fiber is used as the inorganic additive, a resin composition may be expected to be increased in heat resistance.

The organic additive includes starch and the derivative thereof, cellulose and the derivative thereof, pulp and the derivative thereof, paper and the derivative thereof, wheat flour, bean curd refuse, bran, coconut shell, coffee waste, protein, or phthalic acid-, aliphatic polybasic acid-, glycerin-, citric acid-, glycol- and olefin-low molecular weight compounds, or polyethylene terephthalate fiber, polyethylene naphthalate fiber, and aramid fiber, or the like. These may be used alone or in combination with two or more kinds.

The addition amount of the other resins, polymers or additives is arbitrarily selected depending on the application, so long as the object of the present invention is not impaired.

<Production Method of Polylactic Acid Resin Composition>

As a method for producing the polylactic acid resin composition of the present invention, a well-known production method may be arbitrarily employed. For example, there may be adopted a method of uniformly premixing each component using a high-speed mixer, a low-speed mixer or the like and then melt-kneading the resulting composition using a single- or multiple-screw extruder having sufficient kneading capacity at the melting point or higher of the resin, a method of mixing and kneading at the time of melting, a method of removing a solvent after mixing in a solution, and the like.

The production of a polylactic acid composition may be carried out before the molding of a molded article, or the production and molding of the composition may be carried out simultaneously. When the composition is produced before the molding, the shape of the resin composition is preferably a pellet, rod, powder or the like.

<Polylactic Acid Resin Composition>

The polylactic acid resin composition of the present invention is excellent in that it has a fast rate of crystallization. Here, in the differential scanning colorimetry (DSC) analysis, when a polymer is heated to be melt and then cooled to a predetermined temperature at a fixed rate and maintained at the predetermined temperature, the "rate of crystallization" in the present invention is determined by the time from when the predetermined temperature is maintained until when the exothermal peak due to the crystallization becomes the maximum value (hereinafter also referred to as a "isothermal crystallization time"). If the time is shorter, the rate of crystallization is faster. In addition, the predetermined temperature is arbitrarily selected depending on a polymer to be measured.

The method for the determination of the isothermal crystallization time is specifically as follows. When a resin is comprised of units derived from lactic acid as with the present invention, 5 to 6 mg of a polymer in a film state is weighed in a nitrogen-sealed pan and it is inserted into the nitrogen-sealed DSC measuring part preset at 30° C. and then heated at a temperature rising rate of 100° C./min to melt the polymer at 220° C. for 3 minutes. Subsequently, when the polymer is cooled to a predetermined crystallization temperature (for example 100° C.) at a cooling rate of 99° C./min and maintained at the same temperature, the isothermal crystallization time is determined by the time from when the polymer is cooled to the predetermined temperature until when the exothermal peak due to the crystallization becomes the maximum value.

The isothermal crystallization time of the polylactic acid resin composition of the present invention is 5 minutes or less, preferably from 0.1 to 4 minutes and more preferably from 0.5 to 3 minutes.

<Molded Article>

A molded article of the present invention is composed of the polylactic acid resin composition of the present invention. The molded article of the present invention may be produced by a well-known and generally used method, for example, by the following methods.

(1) In extrusion molding, a film or a sheet may be formed by molding the polylactic acid resin composition of the present invention by a typical T die extrusion molding machine.

(2) In injection molding, a pellet of the polylactic acid resin composition of the present invention is melt and softened, and then the resultant resin composition is filled in a mold to obtain a molded article in a molding cycle of 20 to 300 seconds.

(3) In blow molding (injection blow molding, stretching blow molding or direct blow molding), for example, in case of injection blow molding, a pellet of the polylactic acid resin composition of the present invention is melt by a typical injection blow molding machine, and then the resultant resin composition is filled in a mold to obtain a pre-molded article. The resulting pre-molded article is heated again in an oven (heating furnace) and then placed in a mold maintained at a fixed temperature and pressurized air is fed to blow, and thereby a blow bottle may be obtained.

(4) In vacuum forming and vacuum pressure forming, a film or sheet molded by the same method as in the extrusion molding of the (1) is used as a pre-molded article. The resulting pre-molded article is heated to soften once and is vacuum formed or vacuum pressure formed in a mold maintained at a fixed temperature using a typical vacuum forming machine, and thereby a molded article may be obtained.

(5) In laminate molding, a laminate molded article may be obtained by a method of laminating a film or sheet obtained by the extrusion molding method (1) on other substrate by an adhesive or heat; an extrusion lamination method of directly extruding a molten resin from a T die onto a substrate such as papers, metals, plastics and the like in the same manner as in the extrusion molding method (1); a coextrusion method of melting each of the resin composition of the present invention and the like by a separate extruder and then flowing each melted resin together at die heads to simultaneously extrude; a co-extrusion lamination method combining those methods; and the like.

(6) In tape yarn molding, a film or sheet molded in the same manner as in the extrusion molding (1) is slit into a specific width and is uniaxially hot-stretched in a temperature range from 60 to 140° C., and is further heat fixed in a temperature range from 80 to 160° C. when necessary, and thereby a molded article may be obtained.

(7) In yarn molding, a yarn may be obtained by a melt spinning method of melting the polylactic acid resin composition of the present invention at a temperature of from 150 to 240° C. using an extruder and then discharging the resulting composition from a spinneret. When needed, a yarn may be formed by uniaxially hot-stretching the composition in a temperature range from 60 to 100° C., and in some cases, by further heat fixing in a temperature range from 80 to 140° C.

(8) In non-woven molding, a molded article may be formed by a span bond method or a melt blown method. In the span bond method, in the same manner as in the yarn molding (7), a web is formed by melt spinning the resin composition using a spinneret having a plurality of holes and then stretching the resulting yarn using an air sucker installed at the lower part of the spinneret, and the web is accumulated on a trapping face and further is press bonded or heat welded by an emboss roll and a smooth roll, and thereby a non-woven fabric may be obtained. In the melt blown method, the molten resin discharged from the spinneret having a plurality of holes is brought into contact with a high speed heated gas blown from a heated gas outlet to form fine fibers and the resulting fibers are accumulated on a moving support, and thereby a non-woven fabric may be obtained.

The molded article of the present invention, which is heat treated at 80 to 120° C. for 1 to 300 seconds, has a haze of 0.1 to 15%, preferably 0.1 to 12% and more preferably 0.1 to 11% as measured at a thickness of 100 μm, and has a crystallinity of 35% or more, preferably 35 to 60% and more preferably 35 to 55%.

The "crystallinity" in the present invention is determined by differential scanning colorimetry (DSC). Specifically, firstly, a non-oriented film obtained by press molding is heat treated in an oven at 105° C. for a predetermined time period. 5 to 6 mg of the film after the heat treatment is weighed in a nitrogen-sealed pan, and it is inserted into the nitrogen-sealed DSC measuring part preset at 30° C. and then heated to 220° C. at a temperature rising rate of 10° C./min. The crystallization enthalpy ($\Delta Hc$) and crystal melting enthalpy ($\Delta Hm$) are measured to determine $[[(\Delta Hm - \Delta Hc)/(\Delta H_0)] \times 100]$, which is used as a crystallinity. Here, $\Delta H_0$ represents a completely ideal crystal melting enthalpy, for example, the $\Delta H_0$ of polylactic acid is 93 J/g. In addition, the "haze" in the present invention is a value measured by a hazemeter.

<Application>

The polylactic acid resin composition of the present invention may be molded by the various molding and processing methods described above and may be suitably used for various applications without any particular limitation. In addition, these molded articles may be employed for various applications, such as automobile parts, home electric appliance material parts, electric and electronic components, building members, civil engineering members, agricultural materials, commodities, various films, breathable films or sheets, foamed products suitable for general industrial applications and recreation uses, yarns, textiles, medical or sanitary materials, and the like, and preferably, for automobile material parts, home electric appliance material parts and electric and electronic parts which require heat resistance and impact resistance, or commodities which require heat resistance and transparency.

Specifically, there may be mentioned the development into parts such as front doors, wheel caps and the like, in which resin parts are conventionally used, in the automobile part material uses; the development into package parts of products such as personal computers, headphone stereos and mobile phones in home electric appliance material part uses; and the development into reflective material films and sheets and polarizing films and sheets in the electric and electronic parts; and the development into cups for drinking, trays for vegetables, blister packs or the like in commodities.

EXAMPLES

Hereinafter, the present invention will be specifically explained based on Examples, but the present invention is not limited by these Examples.

<Weight Average Molecular Weight>

The weight average molecular weight was determined by gel permeation chromatography (GPC) ["Shodex GPC-101" manufactured by Showa Denko K.K., column: "PLgel mixd c" manufactured by Polymer Laboratories, Inc., two columns in series, column temperature: 40° C., mobile phase: chloroform, flow rate: 1 mL/min] through the comparison with a polystyrene standard sample.

<Rate of Crystallization (Isothermal Crystallization Time)>

The Rate of crystallization was determined by DSC ("DSC-60" manufactured by Shimadzu Corporation). 5 to 6 mg of a non-oriented film obtained by press molding was weighed in a nitrogen-sealed pan, and it was inserted into the nitrogen-sealed DSC measuring part preset at 30° C. and then heated at a temperature rising rate of 100° C./min to melt at 220° C. for 3 minutes. After the melting, it was cooled to 100° C. at a cooling rate of 99° C./min. The time taken for the crystallization peak to become maximum was measured using the time when it was cooled to 100° C. as the starting time.

<Crystallinity>

The crystallinity was measured by DSC ("DSC-60" manufactured by Shimadzu Corporation). A non-oriented film obtained by press molding was heat treated in an oven at 105° C. for a predetermined time period. 5 to 6 mg of the film after the heat treatment was weighed in a nitrogen-sealed pan, and it was inserted into the nitrogen-sealed DSC measuring part preset at 25° C. and then heated to 220° C. at a temperature rising rate of 10° C./min. The crystallization enthalpy ($\Delta Hc$) and crystal melting enthalpy ($\Delta Hm$) were measured to determine [[($\Delta Hm - \Delta Hc$)/($\Delta H_0$)]×100], which was used as a crystallinity. Here, $\Delta H_0$ represents a completely ideal crystal melting enthalpy, and a value of 93 J/g of polylactic acid was used.

<Transparency (Haze)>

The haze was determined by a hazemeter "NDH 2000" manufactured by Nippon Denshoku Industries Co., Ltd.) according to JIS K7105.

Synthesis Example 1

A 200 mL glass reaction apparatus equipped with a stirrer, a thermometer and a condenser was charged with 200.0 g (1.389 mol) of L-lactide, 2.43 g (0.017 mol) of D-lactide, 0.36 g of PEG#200 (Mw=200, reagent special grade, manufactured by Kanto Chemical Co., Inc.) and 16.2 mg of tin octanoate, and the mixture was heated to 190° C. while stirring at a rate of 150 rpm under a nitrogen atmosphere. While continuously stirring, polymerization was carried out at 190 to 200° C. for 2 hours. During the polymerization, because as the viscosity of the polymer increased, stirring became difficult, the stirring rate was decreased up to 50 rpm while observing the stirring. The polymerization was completed by confirming that the viscosity of the resulting polymer was sufficiently increased and the weight average molecular weight (Mw) of the polymer measured by GPC was 178,000.

After the polymerization, after once discharging the polymer to a tray to cool, the polymer was dissolved in 2,000 mL of chloroform. While stirring the chloroform solution, methanol was added by small and small. Since the solution was clouded when approximately 2,000 mL of methanol was added, the addition of methanol was temporarily stopped, and the polymer was gradually precipitated while stirring. After 2 hours, since the polymer was fully precipitated, an approximately 4,000 mL of methanol was further added, and the mixture was sufficiently stirred for one hour to remove the remaining lactide, and then the polymer was suction filtrated and separated. The filtered agglomerates were washed by rinsing with a small amount of methanol and then further stirred in 3,000 mL of methanol for one hour, and then the agglomerates were suction filtrated to remove completely the remaining lactide. The polymer obtained in this manner was dried at 50° C. and 2 kPa for 24 hours to obtain 190.0 g of polylactic acid (A-1) having a partial structure derived from PEG#200. The resulting polylactic acid (A-1) had a weight average molecular weight (Mw) of 214,000.

Synthesis Example 2

Using the same reaction apparatus as in Synthesis Example 1, 179.7 g of a polylactic acid (A-2) having a partial structure derived from PEG#2000 was obtained in the same manner as in Synthesis Example 1 except for changing PEG#200 to 3.69 g of PEG#2000 (Mw=2050, reagent special grade, manufactured by Kanto Chemical Co., Inc.). The resulting polylactic acid (A-2) had a weight average molecular weight (Mw) of 151,000.

Synthesis Example 3

Using the same reaction apparatus as in Synthesis Example 1, 194.0 g of a polylactic acid (A-3) having a partial structure derived from PPG#425 was obtained in the same manner as in Synthesis Example 1 except for changing PEG#200 to 0.97 g of PPG#425 (Mw=450, reagent special grade, manufactured by Kanto Chemical Co., Inc.). The resulting polylactic acid (A-3) had a weight average molecular weight (Mw) of 186,000.

Synthesis Example 4

Using the same reaction apparatus as in Synthesis Example 1, 190.2 g of a polylactic acid (A-4) having a partial structure derived from PPG#2000 was obtained in the same manner as in Synthesis Example 1 except for changing PEG#200 to 4.75 g of PPG#2000 (Mw=2200, reagent special grade, manufactured by Kanto Chemical Co., Inc.). The resulting polylactic acid (A-4) had a weight average molecular weight (Mw) of 198,000.

Synthesis Example 5

Using the same reaction apparatus as in Synthesis Example 1, 198.4 g of a polylactic acid (A-5) having a partial structure derived from a polyester diol was obtained in the same manner as in Synthesis Example 1 except for changing PEG#200 to 5.14 g of a polyester diol (Mw=2045) having hydroxyl groups at both terminals which is obtained from adipic acid and 1,4-butanediol. The resulting polylactic acid (A-5) had a weight average molecular weight (Mw) of 158,000.

Synthesis Example 6

Using the same reaction apparatus as in Synthesis Example 1, 196.7 g of a polylactic acid (A-6) having a partial structure derived from a polycaprolactone diol was obtained in the same manner as in Synthesis Example 1 except for changing PEG#200 to 4.33 g of a polycaprolactone diol (Mw=2000, Trade name: Placcel 220, manufactured by Daicel Chemical Industries Ltd.). The resulting polylactic acid (A-6) had a weight average molecular weight (Mw) of 193,000.

Synthesis Example 7

Using the same reaction apparatus as in Synthesis Example 1, 196.7 g of a polylactic acid (A-7) having a partial structure derived from a polycarbonate diol was obtained in the same manner as in Synthesis Example 1 except for changing PEG#200 to 4.51 g of a polycarbonate diol (Mw=2020, Trade name: Placcel CD220, manufactured by Daicel Chemical Industries Ltd.) derived from 1,6-hexanediol. The resulting polylactic acid (A-7) had a weight average molecular weight (Mw) of 202,000.

Synthesis Example 8

Using the same reaction apparatus as in Synthesis Example 1, 202.5 g of a polylactic acid (A-8) having a partial structure derived from PEG#4000 was obtained in the same manner as in Synthesis Example 1 except for changing PEG#200 to 11.0 g of PEG#4000 (Mw=6225, manufactured by Kanto Chemical Co., Inc.). The resulting polylactic acid (A-8) had a weight average molecular weight (Mw) of 181,000.

Examples 1 to 8

Using a laboplast mill, the polylactic acids (A-1) to (A-8) synthesized in Synthesis Examples 1 to 8, a commercially available polylactic acid (B-1) [Trademark: LACEA, manufactured by Mitsui Chemicals Inc., Grade: H-100, Mw=173,000] and a transparent nucleating agent (C) (EBL: ethylene bislauric acid amide) were kneaded in the parts by weight shown in Table 1 under the conditions at a temperature of 200° C. for 5 minutes and at a rotation speed of 50 rpm. The kneaded product was pressed for 5 minutes under the conditions of 200° C. and 10 MPa to obtain a film having a thickness of 100 μm. The isothermal crystallization time of the resulting film was measured as described above. Further, the film was placed in an oven at 105° C. for 20 seconds and 60 seconds and was subjected to heat treatment, and then the crystallinity and transparency (haze) of the film before and after the annealing were measured as described above. The results are shown in Table 1.

Comparative Examples 1 to 10

A film was prepared in the same manner as in Example 1 except for using the polylactic acids (A-1) to (A-8) synthesized in Synthesis Examples 1 to 8, a commercially available polylactic acid (B-1) [Trademark: LACEA, manufactured by Mitsui Chemicals Inc., Grade: H-100, Mw=173,000] and/or a transparent nucleating agent (C) (EBL: ethylene bislauric acid amide) in the amounts shown in Table 1. The isothermal crystallization time, crystallinity and transparency of the film were measured. The results are shown in Table 1.

TABLE 1

| | Composition | | | | | | Isothermal Crystallization Time (min) | Crystallinity (%) Annealing Time (sec) | | | Haze (%) Annealing Time (sec) | | |
|---|---|---|---|---|---|---|---|---|---|---|---|---|---|
| | Polylactic acid (A) | | Lactic Acid Resin (B) | | Transparent nucleating agent (C) | | | | | | | | |
| | Type | Parts by Weight | Type | Parts by Weight | Type | Parts by Weight | | 0 | 20 | 60 | 0 | 20 | 60 |
| Example 1 | A-1 | 50 | B-1 | 50 | EBL | 0.5 | 0.7 | 20.1 | 30.2 | 45.6 | 0.78 | 1.44 | 6.10 |
| Example 2 | A-2 | 10 | B-1 | 90 | EBL | 0.5 | 0.7 | 19.8 | 29.4 | 44.8 | 0.85 | 1.38 | 6.43 |
| Example 3 | A-3 | 40 | B-1 | 60 | EBL | 0.5 | 0.6 | 18.9 | 29.0 | 46.2 | 0.94 | 1.47 | 5.89 |
| Example 4 | A-4 | 5 | B-1 | 95 | EBL | 0.5 | 0.7 | 21.0 | 31.2 | 45.1 | 0.88 | 1.53 | 6.00 |
| Example 5 | A-5 | 15 | B-1 | 85 | EBL | 0.5 | 0.8 | 20.5 | 30.8 | 44.7 | 0.74 | 1.63 | 5.75 |
| Example 6 | A-6 | 45 | B-1 | 55 | EBL | 0.5 | 0.9 | 19.6 | 30.0 | 46.3 | 0.86 | 1.77 | 6.17 |
| Example 7 | A-7 | 50 | B-1 | 50 | EBL | 0.5 | 0.7 | 19.0 | 33.7 | 40.7 | 0.51 | 2.23 | 6.02 |
| Example 8 | A-8 | 10 | B-1 | 90 | EBL | 0.5 | 0.8 | 20.0 | 34.7 | 43.5 | 0.58 | 2.10 | 6.11 |
| Comparative Example 1 | — | — | B-1 | 100 | EBL | 0.5 | 1.5 | 0 | 5.11 | 28.6 | 0.70 | 4.01 | 57.7 |
| Comparative Example 2 | A-1 | 100 | — | — | EBL | 0.5 | 1.5 | 17.2 | 30.1 | 40.2 | 0.68 | 6.60 | 20.2 |
| Comparative Example 3 | A-2 | 100 | — | — | EBL | 0.5 | 1.6 | 13.8 | 38.0 | 44.2 | 0.77 | 10.5 | 25.7 |
| Comparative Example 4 | A-3 | 100 | — | — | EBL | 0.5 | 1.5 | 16.8 | 23.0 | 45.3 | 0.55 | 6.80 | 21.5 |
| Comparative Example 5 | A-4 | 100 | — | — | EBL | 0.5 | 1.9 | 16.3 | 32.2 | 45.6 | 0.48 | 9.72 | 22.8 |
| Comparative Example 6 | A-5 | 100 | — | — | EBL | 0.5 | 1.6 | 12.6 | 36.7 | 41.0 | 0.58 | 4.49 | 18.3 |
| Comparative Example 7 | A-6 | 100 | — | — | EBL | 0.5 | 1.7 | 10.5 | 39.1 | 45.0 | 0.22 | 5.61 | 20.7 |
| Comparative Example 8 | A-7 | 100 | — | — | EBL | 0.5 | 1.5 | 13.7 | 21.3 | 37.7 | 0.36 | 4.22 | 18.9 |
| Comparative Example 9 | A-8 | 100 | — | — | EBL | 0.5 | 2.1 | 15.6 | 35.4 | 42.0 | 0.65 | 7.31 | 25.2 |

TABLE 1-continued

| | Composition | | | | | | Isothermal Crystalli- zation Time (min) | Crystallinity (%) Annealing Time (sec) | | | Haze (%) Annealing Time (sec) | | |
|---|---|---|---|---|---|---|---|---|---|---|---|---|---|
| | Polylactic acid (A) | | Lactic Acid Resin (B) | | Transparent nucleating agent (C) | | | | | | | | |
| | Type | Parts by Weight | Type | Parts by Weight | Type | Parts by Weight | | 0 | 20 | 60 | 0 | 20 | 60 |
| Comparative Example 10 | — | — | B-1 | 100 | — | — | >30 *1 | 0 | 0 | 5 | 0.21 | 0.26 | 0.33 |

*1: not detected at the measurement of 30 min.

The invention claimed is:

1. A polylactic acid resin composition, comprising: 100 parts by weight of a polylactic acid compound (A) having a weight average molecular weight (Mw) of 5,000 to 500,000, 5 to 2,000 parts by weight of a lactic acid resin (B) containing 50% by mole or more of L-lactic acid units and 0.1 to 10 parts by weight of at least one kind of a transparent nucleating agent (C) selected from carboxylic acid amides, aliphatic alcohols and aliphatic carboxylic acid esters,
   wherein the polylactic acid compound (A) is obtained by copolymerizing at least one compound having a soft segment selected from polyalkylene glycols and polycarbonates having hydroxyl groups at both terminals with a monomer containing L-lactide or L-lactic acid as a main component,
   wherein the compound having a soft segment contains an aliphatic hydrocarbon group having a weight average molecular weight of 25 to 50,000 without containing a ring structure, and the hydrocarbon group may contain an oxygen atom, a nitrogen atom or a sulfur atom, and
   wherein the carboxylic acid amide is at least one kind selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylene biscapric acid amide, ethylene bislauric acid amide, ethylene bisstearic acid amide, ethylene bisoleic acid amide, hexamethylenebiscapric acid amide, hexamethylenebislauric acid amide, hexamethylenebisstearic acid amide, hexamethylenebisoleic acid amide, hexamethylene-bis-12-hydroxystearic acid amide, m-xylylene-bis-capric acid amide, m-xylylene-bis-lauric acid amide, m-xylylene-bis-stearic acid amide, m-xylylene-bis-oleic acid amide and m-xylylene-bis-12-hydroxystearic acid amide.

2. The polylactic acid resin composition according to claim 1, wherein when the polylactic acid resin composition is melted at 220° C. for 3 minutes and then cooled to 100° C. at a cooling rate of 99° C./min and maintained at 100° C., the isothermal crystallization time is 5 minutes or less.

3. The polylactic acid resin composition according to claim 1, wherein the lactic acid resin (B) is a polylactic acid.

4. The polylactic acid resin composition according to claim 3, wherein the transparent nucleating agent (C) is a carboxylic acid amide.

5. A molded article, the article comprising the polylactic acid resin composition according to claim 1 and having a haze of 0.1 to 15% as measured at a thickness of 100 μm and a crystallinity of 35% or more.

6. The polylactic acid resin composition according to claim 1, wherein the polylactic acid compound (A) contains 75% by mole or more of L-lactic acid units and lactic acid resin (B) contains 75% by mole or more of L-lactic acid units.

7. The polylactic acid resin composition according to claim 1, wherein the aliphatic carboxylic acid ester is at least one kind selected from the group consisting of lauric acid cetyl ester, palmitic acid cetyl ester, stearic acid cetyl ester, dilauric acid glycol, monolauric acid glycerin ester and monostearic acid glycerin ester.

8. The polylactic acid resin composition according to claim 1, wherein the composition is substantially free of (co)polymer containing D-lactic acid unit as a main component.

* * * * *